United States Patent [19]
Imafuji et al.

[11] Patent Number: 5,335,042
[45] Date of Patent: Aug. 2, 1994

[54] CAMERA WITH A MOTION COMPENSATION DEVICE

[75] Inventors: Kazuharu Imafuji; Nobuhiko Terui; Akira Katayama, all of Tokyo, Japan

[73] Assignee: Nikon Corporation, Tokyo, Japan

[21] Appl. No.: 7,533

[22] Filed: Jan. 22, 1993

[30] Foreign Application Priority Data

Jan. 24, 1992 [JP] Japan .................................. 4-032999

[51] Int. Cl.⁵ .......................... G03B 7/08; G03B 17/38
[52] U.S. Cl. ..................................... 354/430; 354/443; 354/268
[58] Field of Search ............... 354/266, 268, 430, 202, 354/70

[56] References Cited

U.S. PATENT DOCUMENTS 4,901,096  2/1990  Lemelson ........................... 354/268

FOREIGN PATENT DOCUMENTS 59-222823  12/1984  Japan .

*Primary Examiner*—W. B. Perkey
*Attorney, Agent, or Firm*—Thomas R. Morrison

[57] ABSTRACT

A camera, having a motion compensation device, permits the user to select one of two modes of operations using a selector switch. Partial depression of a shutter release button initiates exposure and auto-focus routines while complete depression actuates an exposure routine effecting a shutter release. A first mode of operation enables the motion compensation device and prevents or delays an exposure from being executed if a motion level of the camera is outside a maximum range of compensation. A second mode of operation permits an exposure to be executed regardless of whether the camera motion level is outside of the maximum range of compensation, thus allowing events to be rapidly photographed on-demand. A first embodiment of the first mode of operation calculates exposure and focus parameters and then repetitively monitors the motion level until the motion level is within the maximum range of compensation and the exposure is executed. A warning signal is produced indicating excessive motion during the repetitive motion level monitoring. A second embodiment repetitively executes exposure and focus routines in sequence with the monitoring of the motion level. When the motion level is within the maximum range of compensation a shutter release is executed utilizing updated exposure and focus parameters. Another embodiment of the invention incorporates both first and second embodiments of the present invention and a second selector switch for selecting between operation according to either embodiment.

22 Claims, 3 Drawing Sheets

LENS BODY SYSTEM

CAMERA BODY SYSTEM

CAMERA WITH A MOTION COMPENSATION DEVICE

BACKGROUND OF THE INVENTION

The present invention relates to a camera with a motion compensation device for stabilizing images, and more particularly, to a camera having a movement compensation device which cancels movements of a position of an image in the focal plane which has priority modes for either shutter release or motion compensation.

A variety of mechanisms for compensation of camera motion have been proposed. Such mechanisms measure camera motion using centripetal force sensors for detecting angular velocity, or gyroscopic or piezoelectric sensors for detecting acceleration. Data gathered from the sensors is used in calculating a lens adjustment required to compensate for the motion. The lens adjustment is completed using a motor or a voice coil to actuate a compensation lens.

The prior art mechanisms determine whether the camera motion is within a maximum range of compensation. If the motion exceeds the maximum range of compensation a shutter release operation is overridden, or delayed, until the detected motion level is within a maximum range of compensation. This type of operation is undesirable when on-demand shutter release is required, such as in sports or journalistic photography. These applications require that an event be captured regardless of a possibility of blurring of the picture.

OBJECTS AND SUMMARY OF THE INVENTION

An object of the present invention is to provide a camera with a motion compensation device that overcomes the drawback of the prior art.

A further object of the present invention is to provide a camera with a motion compensation device that allows the user to override a shutter release delay, or lock-out mechanism, of the motion compensation device so that events may be photographed on-demand. Either a shutter release priority mode or a motion compensation mode may be selected using a mode select switch on the camera.

Briefly stated, a camera having a motion compensation device, permits the user to select one of two modes of operations using a selector switch. Partial depression of a shutter release button initiates exposure and autofocus routines while complete depression actuates an exposure routine effecting a shutter release. A first mode of operation enables the motion compensation device and prevents or delays an exposure from being executed if a motion level of the camera is outside a maximum range of compensation. A second mode of operation permits an exposure to be executed regardless of whether the camera motion level is outside of the maximum range of compensation, thus allowing events to be rapidly photographed on-demand. A first embodiment of the first mode of operation calculates exposure and focus parameters and then repetitively monitors the motion level until the motion level is within the maximum range of compensation and the exposure is executed. A warning signal is produced indicating excessive motion during the repetitive motion level monitoring. A second embodiment repetitively executes exposure and focus routines in sequence with the monitoring of the motion level. When the motion level is within the maximum range of compensation a shutter release is executed utilizing updated exposure and focus parameters. Another embodiment of the invention incorporates both first and second embodiments of the present invention and a second selector switch for selecting between operation according to either embodiment.

According to an embodiment of the present invention there is provided a camera, having a motion compensation feature, comprising: means for detecting a motion level of the camera, means for compensating motion of the camera, the means for compensating having a maximum range of compensation, means for exposing an image, means for preventing exposing an image when the motion level exceeds the maximum range of compensation, and means for selectively disabling the means for preventing exposing an image.

According to another embodiment of the present invention there is provided a camera, having a motion compensation feature, comprising: means for measuring a motion level of the camera, means for compensating motion of the camera, the means for compensating having a maximum range of compensation, means for exposing an image, means for preventing exposing an image while the motion level exceeds the maximum range of compensation, the means for preventing including a means for repetitively measuring the motion level, the means for preventing including a means for delaying actuated sequentially with the means for repetitively measuring, and means for selectively disabling the means for preventing exposing an image.

Still another embodiment of the present invention provides a camera, having a motion compensation feature, comprising: means for measuring a motion level of the camera, means for compensating motion of the camera, the means for compensating having a maximum range of compensation, means for exposing an image, means for preventing exposing an image while the motion level exceeds the maximum range of compensation, the means for preventing including a means for reactivating the means for measuring, and means for selectively disabling the means for preventing exposing an image.

According to yet another embodiment of the present invention there is provided a camera, having a motion compensation feature, comprising: means for measuring a motion level of the camera, means for compensating motion of the camera, the means for compensating having a maximum range of compensation, means for exposing an image, means for preventing exposing an image while the motion level exceeds the maximum range of compensation, the means for preventing having a first and a second means for preventing exposing an image, means for selectively disabling the means for preventing exposing an image, the first means for preventing including a means for reactivating the means for measuring, the second means for preventing including a means for repetitively measuring the motion level, the second means for preventing including a means for delaying actuated sequentially with the means for repetitively measuring.

According to a feature of the present invention there is provided a method, for operating a camera having a motion compensation feature, comprising: measuring a motion level after a first switch is set, determining whether a shutter release priority mode or a motion compensation priority mode is selected, activating a shutter release routine followed by ending the process if the shutter release priority mode is selected, comparing the motion level to a maximum range of compensation if the motion compensation priority mode is selected, activating a shutter release routine employing motion compensation if the motion level is within the maximum range of compensation, delaying the shutter release route, if the motion level is outside of the maximum range of compensation, until a new motion level is measured is within the maximum range of compensation.

The above, and other objects, features and advantages of the present invention become apparent from the following description read in conjunction with the accompanying drawings, in which like reference numerals designate the same elements.

DETAILED DESCRIPTION OF THE PREFERRED EMBODIMENTS

Figure 1:
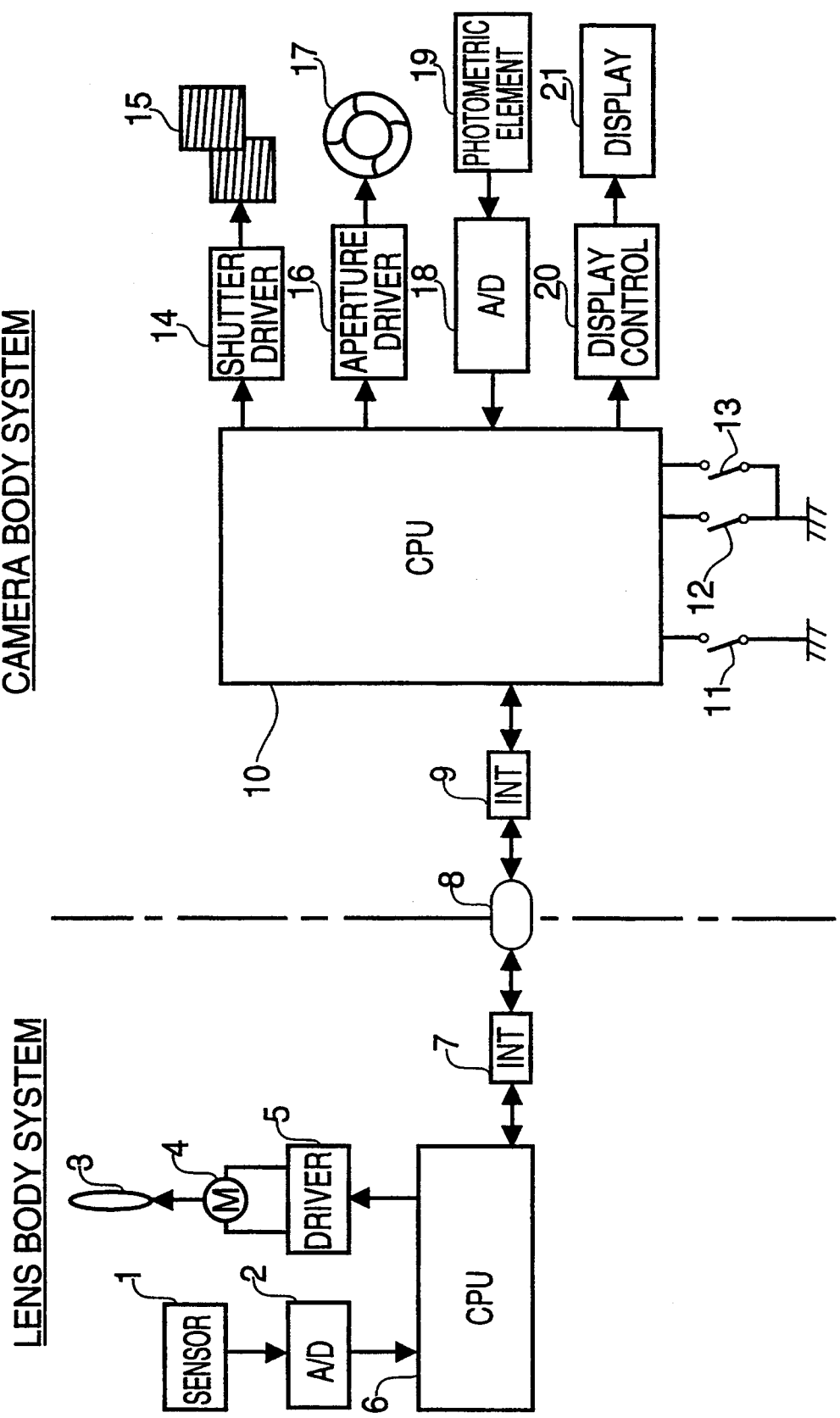
FIG. 1 is a schematic diagram of camera system according to an embodiment of the present invention.

Referring to FIG. 1, the present invention comprises a camera system composed of a lens body system and a camera body system. The lens body system includes a motion sensor 1 interfaced to a first central processing unit 6 (hereinafter first CPU) via an A/D converter 2. The first CPU 6 calculates an amount of adjustment of compensating lens 3 required to prevent picture blurting based upon the data from the motion sensor 1. The first CPU 6 adjusts the compensating lens 3 the required amount by actuating a driver circuit 5 which drives a motor 4.

The camera body system has a shutter release button which incorporates a first switch 12 and a second switch 13. The first and second switches 12, 13, connect to a second CPU 10. The first switch 12 closes when the shutter release button is depressed halfway, initiating distance and light measuring operations of the camera via the second CPU 10. The second switch 13 closes when the shutter release button is further depressed, initiating the shutter release operation.

A focal plane shutter 15, having a front and a rear shade, is controlled by a shutter driver circuit 14 controlled by the second CPU 10. A diaphragm aperture 17, for setting an f-stop, is controlled by an aperture driver circuit 16 connected to the second CPU 10. A photometric element 19 supplies subject information via an A/D converter 18 to the second CPU 10 for use in focusing, and determining an f-stop setting and a shutter speed. Finally, a display 21, such as a liquid crystal display, is driven by the second CPU 10 via a display controller 20. The display 21 informs the user of the camera settings and conditions sensed, including the amount of camera motion.

A mode selector switch 11 is coupled to the second CPU 10 for setting an operating mode of the camera to one of either shutter release priority or motion compensation priority. In the shutter release priority mode, the second CPU 10 permits the user to take a picture regardless of the level of camera motion. In the compensation priority mode, the second CPU 10 prevents, or delays, a shutter release if the motion of the camera is outside of the maximum range of compensation of the system.

Figure 2:
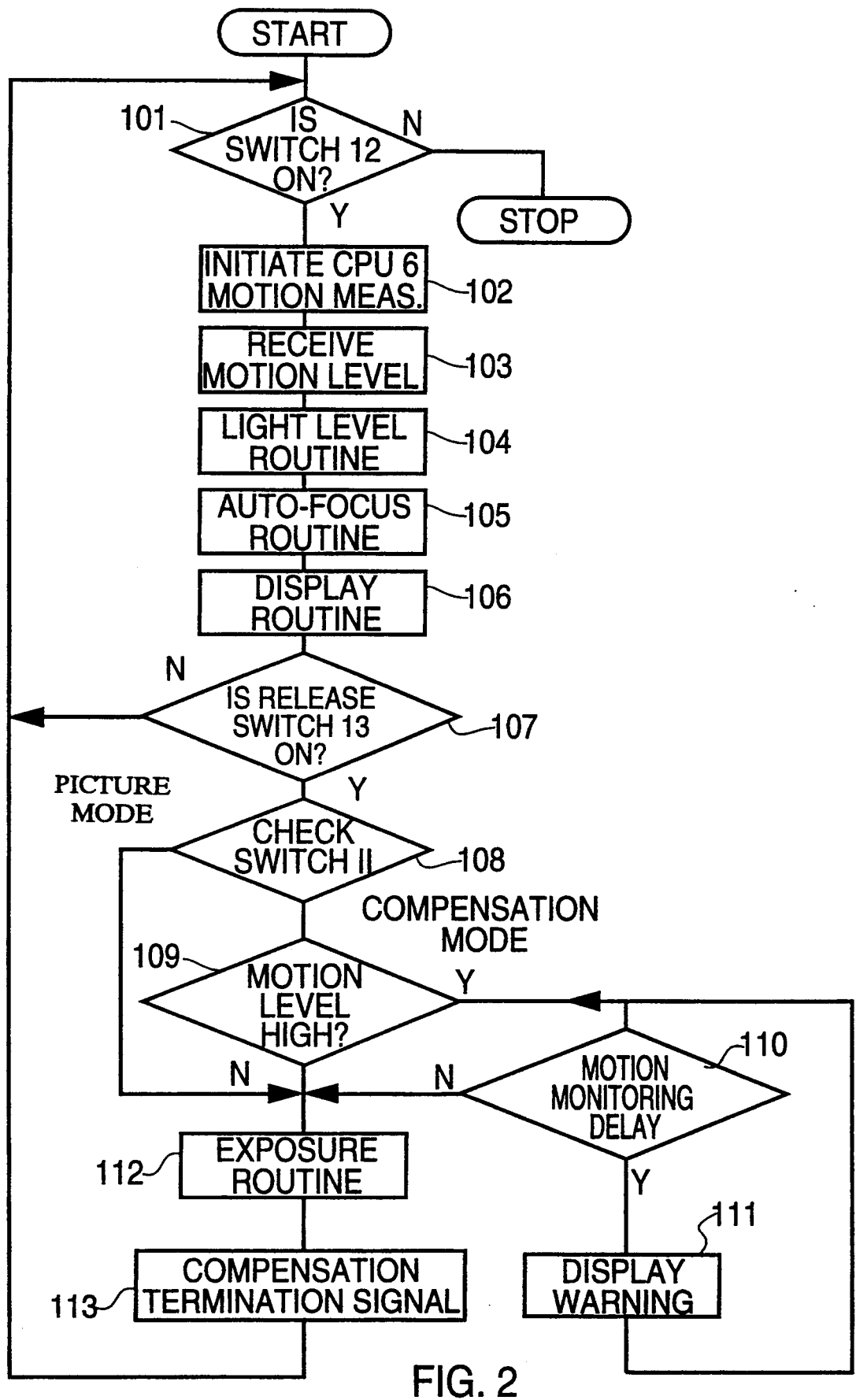
FIG. 2 is a flow chart of a process of a first embodiment of the present invention.

Referring to FIG. 2, a flow chart of the operation of a first embodiment of the present invention shows a decision operation based upon a condition of the first switch 12 at step 101. If the first switch 12 is "on", the second CPU 10 signals the first CPU 6 to initiate the motion compensation process at step 102; if the first switch 12 is "off", the process stops. The first CPU 6 calculates a camera motion level, based on information from the sensor 1, upon the receipt of the signal from the second CPU 10. In step 103, the second CPU 10 receives the motion level data from first CPU 6. Second CPU 10 then performs a light level measurement in step 104 and calculates the required f-stop and shutter speed. In step 105, the second CPU 10 executes an auto-focus routine wherein a distance to a subject is sensed and the camera lens is adjusted to focus an image of the subject. The second CPU 10 then displays on display 21 the f-stop and shutter speed settings in step 106 as determined in step 104. At a step 107 the previous steps continue if the second switch 13 is "off" until first switch 12 is "off" or second switch 13 is "on".

When the second switch 13 is "on", either the shutter release priority mode or the motion compensation priority mode is selected at decision step 108 based upon a position of the mode selector switch 11. If the mode selector switch 11 is in a motion compensation priority mode position, the process proceeds to step 109 wherein it is determined if the motion level is within the maximum range of compensation.

A motion level outside of the maximum range of compensation will result in the process proceeding to step 100 wherein a delay period is executed during which the motion level is monitored. If the motion level within the maximum range of compensation is detected during the delay period, the process proceeds to step 112 wherein an exposure routine, effecting a shutter release, is executed. If the motion level remains in excess of the maximum range of compensation, step 111 is executed, displaying a warning to the user followed by a re-execution of step 110. The warning may be displayed by various methods including annunciator lights, alphanumeric LCD or LED displays, or audio transducers.

The first embodiment permits the system to repetitively monitor the motion level during a cycle of steps 110 and 111. Monitoring is done at a high enough frequency that only a minimum delay elapses before the shutter release of step 131 is be executed after the motion level falls within the maximum range of compensation. Therefore, the delay in taking a motion compensated picture is minimized.

In step 112 an exposure routine is executed when switch 11 is "on", and the motion level is within the maximum range of compensation or the camera is in the shutter release priority mode. During the exposure routine of step 112, the second CPU 10 adjust the f-stop by driving the diaphragm aperture 17 via the aperture driver 16. A deviating mirror, in a single lens reflex camera, is then swung into an "up" position allowing a photo image to reach the focal plane shutter 15. The focal plane shutter 15 is then released by the second CPU 10 via shutter driver 14. The focal plane shutter exposes a photographic film behind it for a period of time controlled by the shutter speed determined in step 104. The first CPU 6 operates compensating lens 3 using the motor 4, and the driver circuit 5, during the exposure routine when the motion level is within the maximum range of compensation. The compensation lens is actuated to keep the focal plane image steady during the exposure routine. Finally, an end of compensation signal is transmitted by the second CPU 10 to the first CPU 6 in step 113, followed by the process returning to step 101.

Figure 3:
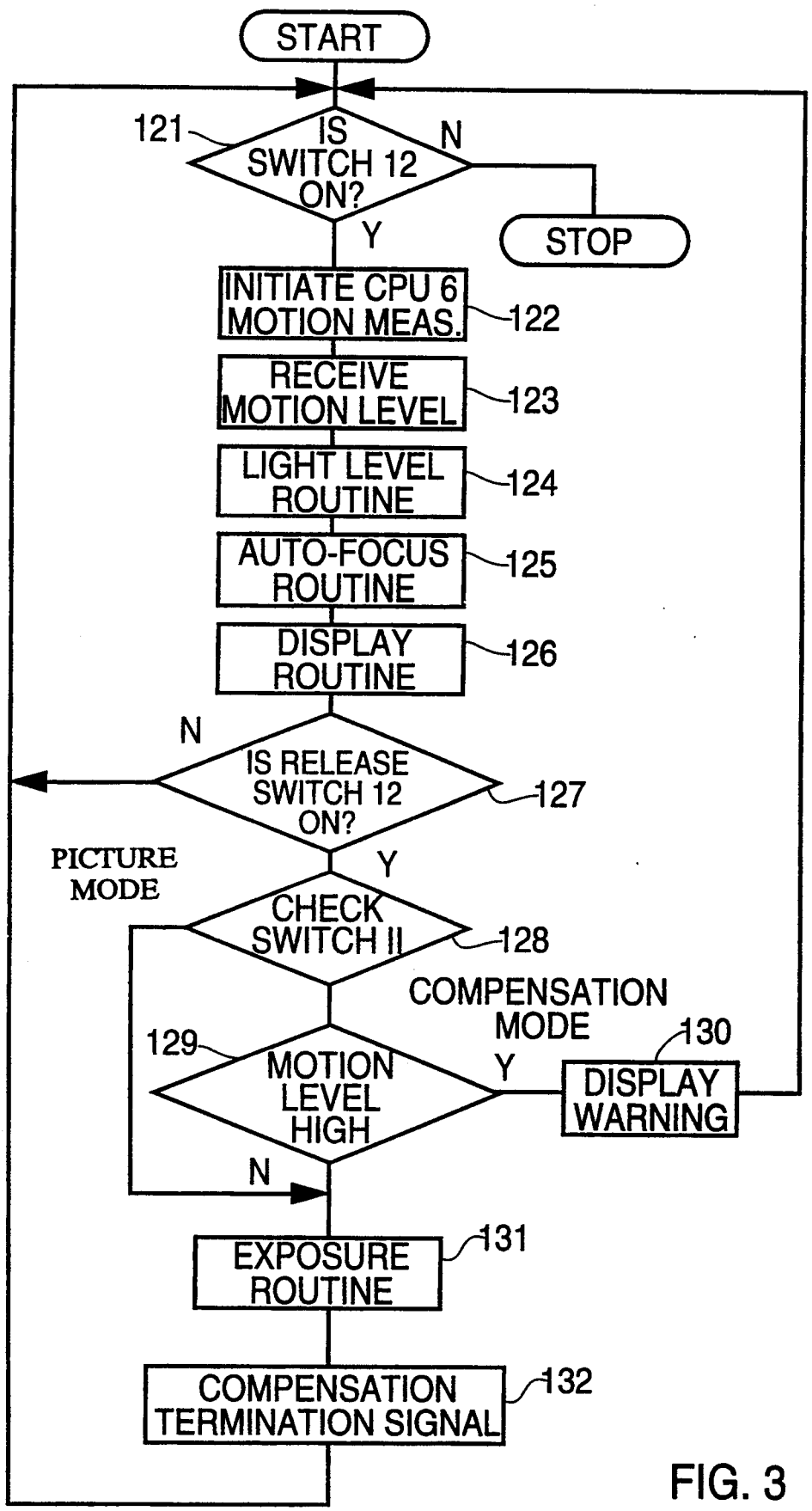
FIG. 3 is a flow chart of a process of a second embodiment of the present invention.

Referring to FIG. 3, a flow chart of a second embodiment of the present invention shows a process similar to that of the first embodiment except as noted herein. Steps 121 through steps 129 are identical to steps 101 through 109, respectively, of the first embodiment as described above. Step 129 is executed if the motion compensation priority mode is chosen, which is determined by the position of the mode selector switch 11 in step 128. In step 129 the second CPU 10 determines whether the motion level is within the maximum range of compensation. If it is determined that the motion level is outside of the maximum range of compensation, the process proceeds to step 130 which displays a warning to the user that the shutter release is delayed because of the excessive motion. Such a warning may be effected by various means readily recognized by those skilled in the art. Following the warning, the process returns to step 121 wherein the first switch 12, of the shutter release button, is monitored. If the first switch 12 remains in the "on" position, indicating that the user intends to take a picture, the process repeats itself until the motion level is within the maximum range of compensation or the operating mode is switched to the shutter release priority mode.

Alternatively, if it is determined in step 129 that the motion level is within the maximum range of compensation, or if in step 128 it is determined that the shutter release priority mode is selected, the process proceeds to step 131 and an exposure routine is executed. As noted above for steps 112 and 113, the exposure routine actuates the diaphragm aperture and the focal plane shutter following the raising of the deviating mirror, after which a compensation termination signal is sent to first CPU 6 in the lens body system. Upon completion of step 132, the process returns to step 121 wherein the shutter release button, first switch 12, is monitored.

In the second embodiment, if it is determined that the motion level is excessive, the system repeats the light level routine and the auto-focus routine of steps 124 and 126, respectively, before the motion level is again checked in step 129. This permits the exposure parameters, f-stop and shutter speed, to be repetitively updated until the motion level is within the maximum range of compensation. The second embodiment system allows the use of more current exposure settings than does the process of the first embodiment, since in the first embodiment the exposure parameters are not updated as the motion level is repetitively monitored. However, the possible delay before a shutter release is executed in the second embodiment is greater since the time is required to complete the constant recalculation of the exposure and focus parameters.

An alternative embodiment of the present invention includes both the first embodiment operating process and the second embodiment operating process wherein one of the two processes may be selected using an additional mode selection switch in the camera body system. Since each embodiment is described in detail this combined embodiment requires no additional description to fully inform one skilled in the art to make and use the invention.

The embodiments described above incorporate both auto-focus and light level routines for automating the operation of the camera. However, other embodiments of the present invention include systems without one or both of the routines. Additionally, the present invention includes embodiments directed to cameras other than a single lens reflex cameras having focal plane shutters and diaphragm apertures. Those skilled in the art, in view of this specification, would recognize that the present invention may be employed in various types of cameras having different shutter and aperture mechanisms. For the purposes of the present invention, it is realized that the shutter mechanism encompasses devices effecting the capturing of an image which may include electro-optical shutters and digital storage devices used to capture images digitally.

Finally, while the embodiments described herein are addressed to motion compensation systems employing a compensating lens, other embodiments include systems employing differing compensation mechanisms effective in stabilizing captured images. Such systems may employ optical mechanisms or electronic signal processing means for use in digital image storage devices.

The elements 14–19 of the camera body system in FIG. 1, are conventional, and require no additional description to fully teach one skilled in the art how to make and use them. Similarly, elements 1–6 of the lens body system are convention, and detailed description thereof is omitted.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A camera, having a motion compensation feature, comprising:
   means for detecting a motion level of said camera;
   means for compensating motion of said camera;
   said means for compensating having a maximum range of compensation;
   means for exposing an image;
   means for preventing exposing an image when said motion level exceeds said maximum range of compensation; and
   means for selectively disabling said means for preventing exposing an image.

2. A camera according to claim 1, further comprising:
   a first switch and a second switch;
   means, responsive to said first switch being actuated to a first position at less than its extreme travel, for measuring said motion level; and
   means, responsive to said first switch being at its extreme travel, and said second switch being at a second position, for actuating said means for exposing.

3. A camera according to claim 2, wherein:
   said means for selectively disabling includes a mode selection switch; and
   said means for selectively disabling being responsive to a position of said mode selection switch for one of enabling and disabling said exposing an image.

4. A camera according to claim 3, further comprising:
   said means for preventing including a delay means for executing a delay period while the motion level is outside of said maximum range of compensation;
   said means for preventing having means for repetitively measuring said motion level and executing said delay period while said motion level remains outside said maximum range of compensation; and said means for preventing triggering said means for exposing an image when said motion level is within the maximum range of compensation.

5. A camera according to claim 2, wherein:

said means for measuring includes means for sensing a light level; and said means for measuring includes means for setting an f-stop and a shutter speed responsive to said light level.

6. A camera having a motion compensation feature, according to claim 5, wherein:

said means for preventing actuates a warning indicator while the motion level is outside of said maximum range of compensation;

said means for preventing activates said means for measuring, after activating said warning indicator, such that said f-stop and said shutter speed are reset; and said means for preventing triggers said means for exposing an image when said motion level is within said maximum range of compensation.

7. A camera having a motion compensation feature, according to claim 6, wherein said means for measuring includes means for sensing a distance to a subject and focusing a lens.

8. A camera, having a motion compensation feature, comprising:

means for measuring a motion level of said camera;

means for compensating motion of said camera;

said means for compensating having a maximum range of compensation;

means for exposing an image;

means for preventing exposing an image while said motion level exceeds said maximum range of compensation;

said means for preventing including means for repetitively measuring said motion level;

said means for preventing including means for delaying actuated sequentially with said means for repetitively measuring; and means for selectively disabling said means for preventing.

9. A camera according to claim 8 wherein:

said means for measuring includes means for sensing a light level; and said means for measuring includes means for setting an f-stop and a shutter speed responsive to said light level.

10. A camera according to claim 8, further comprising:

a first switch and a second switch;

said means for measuring said motion level responding to said first switch being actuated to a first position at less than its extreme travel; and said means for exposing responding to said first switch being at its extreme travel and said second switch being at a second position.

11. A camera according to claim 10 wherein:

said means for measuring includes means for sensing a light level; and said means for measuring includes means for setting an f-stop and a shutter speed responsive to said light level.

12. A camera, having a motion compensation feature, comprising:

means for measuring a motion level of said camera;

means for compensating motion of said camera;

said means for compensating having a maximum range of compensation;

means for exposing an image;

means for preventing exposing an image while said motion level exceeds said maximum range of compensation;

said means for preventing including means for reactivating said means for measuring; and means for selectively disabling said means for preventing.

13. A camera according to claim 12 wherein:

said means for measuring includes means for sensing a light level; and said means for measuring includes means for setting an f-stop and a shutter speed responsive to said light level.

14. A camera according to claim 12, further comprising:

a first switch and a second switch;

said means for measuring said motion level responding to said first switch being actuated to a first position at less than its extreme travel; and said means for exposing responding to said first switch being at its extreme travel and said second switch being at a second position.

15. A camera according to claim 14 wherein:

said means for measuring includes means for sensing a light level; and said means for measuring includes means for setting an f-stop and a shutter speed responsive to said light level.

16. A camera, having a motion compensation feature, comprising:

means for measuring a motion level of said camera;

means for compensating motion of said camera;

said means for compensating having a maximum range of compensation;

means for exposing an image;

means for preventing exposing an image while said motion level exceeds said maximum range of compensation;

said means for preventing having a first and a second means for preventing exposing an image;

means for selectively disabling said means for preventing exposing an image;

said first means for preventing including means for reactivating said means for measuring;

said second means for preventing including means for repetitively measuring said motion level;

said second means for preventing including means for delaying actuated sequentially with said means for repetitively measuring.

17. A camera according to claim 16 wherein:

said means for measuring includes means for sensing a light level; and said means for measuring includes means for setting an f-stop and a shutter speed responsive to said light level.

18. A camera according to claim 16, further comprising:

a first switch and a second switch;

said means for measuring said motion level responding to said first switch being actuated to a first position at less than its extreme travel;

said means for exposing responding to said first switch being at its extreme travel and said second switch being at a second position;

said means for selectively disabling responding to a mode selection switch for selecting one of an enabling mode and a disabling mode; and said means for selective disabling responding to an enabling mode selection switch for selecting one of said first means for preventing and said second means for preventing.

19. A camera according to claim 18 wherein:
said means for measuring includes means for sensing a light level; and
said means for measuring includes means for setting an f-stop and a shutter speed responsive to said light level.

20. A method, for operating a camera having a motion compensation feature, comprising:
actuating a first-switch;
measuring a motion level after said first switch is set;
determining whether a shutter release priority mode or a motion compensation priority mode is selected;
activating a shutter release routine followed by ending the method if said shutter release priority mode is selected;
comparing said motion level to a maximum range of compensation if said motion compensation priority mode is selected;
activating a shutter release routine employing motion compensation if said motion level is within said maximum range of compensation;
delaying said shutter release routine, if said motion level is outside of said maximum range of compensation, until a new motion level is measured is within said maximum range of compensation.

21. The method of claim 20 wherein the step of delaying comprises:
indicating an out of range condition; and
executing said method again.

22. The method of claim 21 wherein the step of delaying comprises:
waiting a fixed period;
measuring a new motion level;
activating a shutter release routine employing motion compensation if said new motion level is within said maximum range of compensation;
returning to the step of waiting a fixed period if said motion level is outside of said maximum range of compensation.

* * * * *